April 14, 1925.  
J. H. SAGER  
BUMPER FOR MOTOR VEHICLES  
Filed June 12, 1923
1,533,517
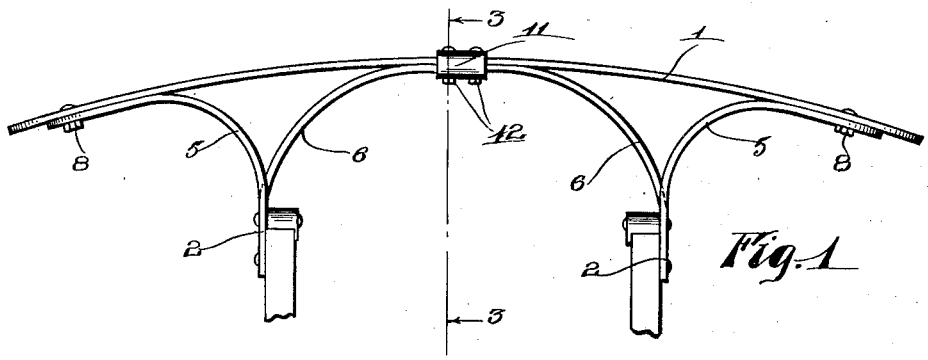
Fig. 1
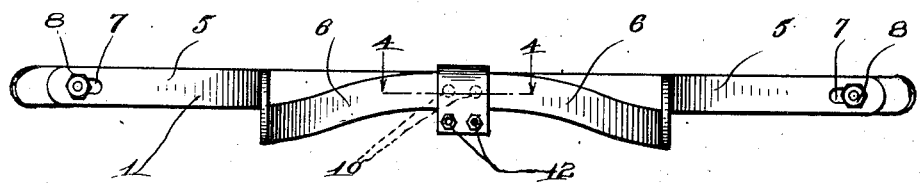
Fig. 2
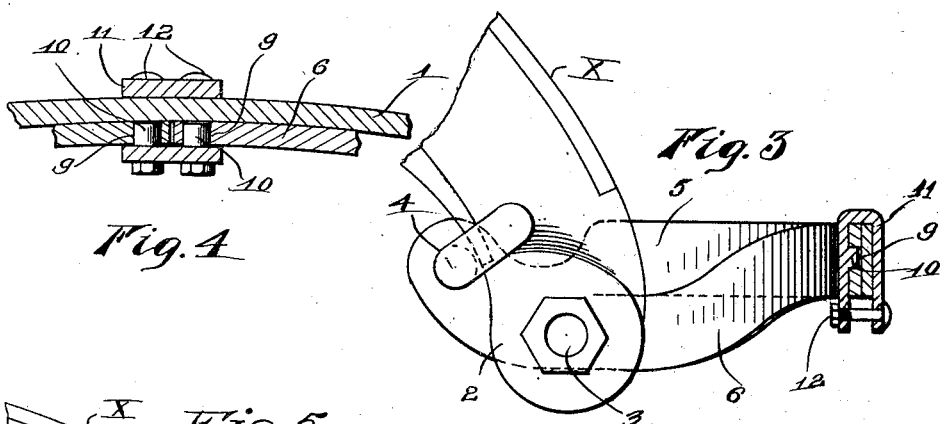
Fig. 3  
Fig. 4
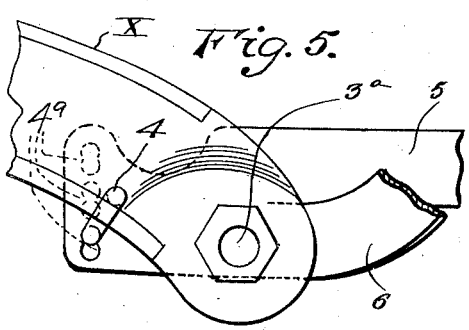
Fig. 5
INVENTOR.  
James H. Sager  
BY Davis & Timms  
his ATTORNEYS.

Patented Apr. 14, 1925.

1,533,517

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

BUMPER FOR MOTOR VEHICLES.

Application filed June 12, 1923. Serial No. 644,975.

*To all whom it may concern:*

Be it known that I, JAMES H. SAGER, a citizen of the United States, and resident of Rochester, in the county of Monroe and State of New York, have invented certain new and useful Improvements in Bumpers for Motor Vehicles, of which the following is a specification.

The present invention relates to bumpers for motor vehicles and more particularly to the supporting means for an impact member, an object of this invention being to provide a construction which may be made economically from sheet metal to provide a resilient support for the impact member. Another object of the invention is to provide a supporting means formed from sheet material with an anchoring portion at its inner end, and two arms projecting in opposite directions from the forward part of the anchoring portion one at a point above the other.

To these and other ends, the invention consists of certain parts and combinations of parts, all of which will be hereinafter described: the novel features being pointed out in the appended claims.

In the drawings:

Fig. 1 is a plan view of a bumper embodying this invention;

Fig. 2 is a rear view of the bumper;

Fig. 3 is a section on the line 3—3, Fig. 1;

Fig. 4 is a section on the line 4—4, Fig. 2;

Fig. 5 is a fragmentary detail view of another embodiment of this invention.

Referring more particularly to the drawings. 1 indicates the impact member of the bumper. This impact member, in this instance, is formed from one piece of sheet material curved or bulged forwardly. The impact member is supported by two supporting members, each of which, in this instance, is made from a single piece of sheet material.

The sheet material is cut to provide a rear anchoring portion 2, as shown in Fig. 3, or 2$^a$, as shown in Fig. 5, the former being provided with two bolt openings 3 and 4, the first of which is secured to the shackle bolt, and the second of which, as is common, is adapted to have a bolt passed therethrough to secure the same to the forward curved end of the side bar of the vehicle. The anchoring portion 2$^a$ of Fig. 5 has the opening 3$^a$ for the shackle bolt and has a series of openings 4$^a$ which permit the anchoring portion to be secured to side bars having different curvatures as it is possible to fasten the securing bolt in any desired one of these openings. From the anchoring portion two arms 5 and 6 extend, the arm 5 proceeding from the forward part of the anchoring portion above the arm 6 and both arms being bent flatwise of the material, one inwardly and the other outwardly, that is, in opposite directions. The arm 5 has at its outer end a slot 7, which by a bolt 8 is secured to the impact member 1 near the end of the latter. The arm 6 is also bent edgewise so that its free end may lie in a horizontal plane of the end of the arm 5. The free end of the arm 6 preferably has an opening 9 and this arm is arranged in proximity to the arm 6 of the other impact supporting member, the two members being reversely formed so that a right and a left supporting member is provided. In the openings 9 of the two arms 6, two projections 10 on the inner face of one arm of an inverted U-shaped strap 11 project, so as to lock these two arms together. Bolts 12 connect the arms of the U-shaped member below the impact member, so that the arms 6 are held securely to the rear face of the impact member.

From the foregoing it will be seen that there has been provided a supporting member for impact members of bumpers formed from a single piece of sheet material and giving resiliency to the impact member, as well as, at the same time, providing a strong, durable and economical supporting means.

What I claim as my invention and desire to secure by Letters Patent is:

1. A bumper supporting member formed from a single piece of sheet material and comprising an anchoring portion with the flat face of the material vertically arranged and two arms proceeding from the forward portion of the anchoring portion, one above the other and curved flatwise of the material in opposite directions, one arm being deflected to bring the outer end thereof in a horizontal plane with the outer end of the other arm.

2. A bumper supporting member comprising a flat anchoring portion provided with bolt openings, one in advance of the other, and two flat arms proceeding in a single vertical plane from the flat anchoring portion and extending in opposite directions.

3. A bumper comprising an impact member, two supporting members, each having an anchoring portion and two arms proceeding in the same vertical plane from the forward portion of the anchoring portion, one above the other, one of said arms extending outwardly and having a slotted connection with the impact member and the other of said arms being extended inwardly and provided with an opening, and a clamping means engaging in the openings of the two inwardly extending arms and also with the impact member.

4. In a bumper, the combination with an impact member, of supporting means for the impact member comprising two pairs of oppositely extending arms, each pair having one arm extending outwardly and secured to the impact member and each pair having an arm extending inwardly and provided with an opening, an inverted U-shaped member having two projections on the inner face of one of its arms, each projection extending in an opening of one of the inwardly extending arms, and a bolt connecting the lower ends of the U-shaped member to hold the inwardly extending arms against the inner face of the impact member.

JAMES H. SAGER.